United States Patent [19]

Sriram et al.

[11] Patent Number: 4,512,638
[45] Date of Patent: Apr. 23, 1985

[54] WIRE GRID POLARIZER

[75] Inventors: Sambamurthy Sriram, Wilkins; Kenneth Steinbruegge, Murrysville; Emmanuel Supertzi, Oakland, all of Pa.

[73] Assignee: Westinghouse Electric Corp., Pittsburgh, Pa.

[21] Appl. No.: 413,594

[22] Filed: Aug. 31, 1982

[51] Int. Cl.³ .............................................. G02F 1/11
[52] U.S. Cl. ...................................... 350/372; 350/1.6; 350/373
[58] Field of Search ......................... 350/370, 371–373, 350/394, 162.2, 1.6, 1.7

[56] References Cited

U.S. PATENT DOCUMENTS

| 3,792,287 | 2/1974 | Roland et al. | 423/508 |
| 3,799,659 | 3/1974 | Roland et al. | 350/321 |
| 3,929,970 | 12/1975 | Isaacs et al. | 423/299 |
| 4,289,381 | 7/1981 | Garvin et al. | 350/320 |

OTHER PUBLICATIONS

Chang, I. C., "Acousto-Optic Tunable Filters", Optical Engineering, vol. 20, No. 6, pp. 824–829.
Auton et al., "Grid Polarizers for Use in the Near Infrared" Infrared Physics, vol. 12, pp. 95–100, 1972.
Auton, "Infrared Transmission Polarizers by Photolithography", Applied Optics, vol. 6, No. 6, pp. 1023–1027.

Primary Examiner—Bruce Y. Arnold
Attorney, Agent, or Firm—T. R. Trempus

[57] ABSTRACT

An infrared wire grid polarizer is fabricated on an infrared transmissive substrate and consists of alternating transmissive and conductive zones disposed thereon. These polarizers are particularly well suited for use with acoustic-optic tunable filters and can be employed as input and output polarizers therewith. A method of manufacturing a wire grid polarizer with at least 4000 conductors per millimeter is disclosed. The infrared transmissive substrate is selected from the group consisting of silicon crystal and gallium arsenide crystal.

9 Claims, 10 Drawing Figures

(100)

(110)

(111)

WIRE GRID POLARIZER

BACKGROUND OF THE INVENTION

1. Field of the Invention

The invention is directed to wire grid polarizers and particularly a polarizer for the infrared portion of the electromagnetic spectrum usable with an infrared acousto-optic tunable filter.

2. Description of the Prior Art

An acousto-optic tunable filter operates through the interaction of high frequency acoustic waves with light waves in a suitable crystal. In certain birefringent optical materials, a light beam propagating as an e-ray, can, under certain conditions, be converted into an o-ray by interaction with, and diffraction from, an acoustic wave propagating in the same medium. This phenomenon has been utilized in producing narrow band optical filters in which the peak transmission wavelength can be selected by properly choosing the frequency of the acoustic wave. Such filters have typically operated in the visible spectral region using collinearly propagating acoustic and light beams in selected oxide materials. It is also known that the acoustic wave can be launched in the acoustic medium non-collinearly with the light beam to achieve the same acousto-optic narrow band filtering.

The development of new efficient infrared acousto-optic materials such as thallium-arsenic-selenide ($Tl_3AsSe_3$) as described in U.S. Pat. No. 3,792,287, the thallium-phosphorous-selenide per U.S. Pat. No. 3,929,970 and thallium-arsenic-sulfide per U.S. Pat. No. 3,799,659, all assigned to the assignee of the present invention, provides the possibility of operation over the near-to-medium infrared range of wavelengths from about 1.3 micrometers to about 16.0 micrometers. The acousto-optic interaction causes the "filtered" wavelengths of light to experience a 90° polarization flip. Thus it has been the practice to utilize input and output polarizers with such acousto-optic materials to effectuate the filter capability. The polarizers have their axes crossed so that only appropriately polarized light reaches the acousto-optic material, and then only light which has undergone the 90° polarization rotation is transmitted from the acousto-optic material through the system.

While a wide selection of low cost polarizers exist for the visible portion of the spectrum, most of these devices do not transmit well out to 16 μm. Infrared transmitting materials which can be used for making prism polarizers are expensive. Additionally, the angular aperture of infrared prism polarizers tends to be much less than the allowable angular aperture of the acousto-optic device. While it is known to utilize prism type or pile-of-plate infrared polarizers, these prior art polarizers tend to limit the radiation throughput through the filter because such polarizers are only efficient for near normal incident light. These polarizers are also very expensive to fabricate and difficult to align with the rest of the light input and detection system with which the filter finds application.

It is also known that an infrared polarizer can be fabricated by providing an array of parallel, spaced conductors upon an infrared transmitting substrate with the spacing between adjacent conductors being less than the wavelength of the infrared light. As shorter wavelengths become of interest, the spacing between conductors is narrowed and in the range of a 1 μm optical wavelength it becomes necessary to produce wire grids of at least 1000 wires per millimeter to achieve significant polarization of the optical beam.

It is the present practice to produce wire grid polarizers with wire densities greater than 1000 wires per millimeter on an infrared transmitting substrate. According to a first method, a wire grid polarizer is formed by ruling a finely spaced diffraction grating on a precisely polished zinc selenide (ZnSe) substrate. The ruled area is then coated with aluminum which is vacuum deposited at an oblique angle to form highly conductive wires at the peaks of the grooves. In a second method, a wire grid polarizer is formed by coating the substrate with photoresist and exposing it with a laser interference pattern. The etched sinusoidal photoresist profile is aluminized at an oblique angle to obtain the required array of conductors.

While the above described wire grid polarizers possess many desirable optical characteristics, they are plagued by their prohibitive cost and extreme fragility.

It is an object of this invention to provide a wire grid polarizer for use with an acousto-optic tunable filter in the infrared range.

It is also an object of this invention to provide a wire grid polarizer which is both inexpensive and much less susceptible to damage during handling.

It is another object of this invention to provide a wire grid polarizer ideally suited for use with a thallium-arsenic-selenide ($Tl_3AsSe_3$) acousto-optic crystal.

SUMMARY OF THE INVENTION

A wire grid polarizer for the infrared portion of the electromagnetic spectrum consists of an infrared transmissive substrate selected from the group consisting of single crystal silicon, and gallium arsenide. The substrate has an input and output surface, at least one of which has alternating-transmissive and conductive zones at the rate of at least 2000 conducting zones per millimeter. A method for significantly increasing the rate of conducting zones per millimeter includes the multiple etching of the substrate surface as well as the etching of both the input and output surfaces of the substrate.

BRIEF DESCRIPTION OF THE DRAWINGS

The above as well as other features and advantages of this invention will become apparent through consideration of the detailed description in connection with the accompanying drawings in which.

DESCRIPTION OF THE PREFERRED EMBODIMENT

Figure 1:
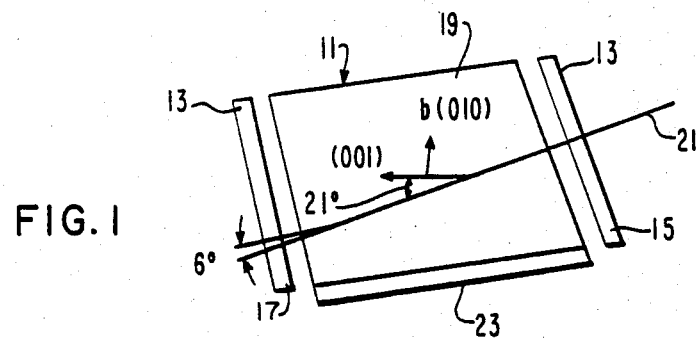
FIG. 1 is an enlarged representation of an acousto-optic tunable filter with wire grid polarizer filters according to this invention.

In FIG. 1, an acousto-optic tunable filter (AOTF) is generally indicated by the reference character 11 and a pair of wire grid polarizers 13 function as an input polarizer 15 and an output polarizer 17 therewith. The acousto-optic tunable filter 11 consists of an acousto-optic medium preferably a thallium-arsenic-selenide crystal 19 which has polished ends. The input optical face of the crystal 19 is oriented so as to be normal to the incident infrared beam 21, while the exit optical face is cut so as to be normal to the output beam which is diffracted at an angle of about 6 degrees to the incident beam. An acoustic transducer 23 is mated to one of the opposed side surfaces of the crystal 19 and can consist of, for example, an X-cut lithium niobate crystal plate which is attached to the acousto-optic crystal with an indium metal bond. A conductive electrode pattern is provided on both sides of the transducer 23. The electrodes are driven by an RF generator (not illustrated).

Figure 2:
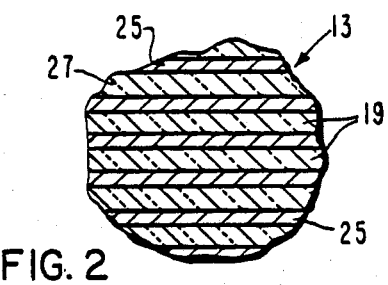
FIG. 2 is a greatly enlarged representation of the input polarizer seen in FIG. 1 illustrating the orientation of the conductors or non-transmissive zones.
Figure 3:
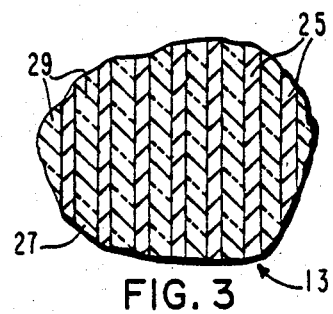
FIG. 3 is a greatly enlarged representation of the output polarizer seen in FIG. 1 illustrating the orientation of the non-transmissive zones thereof relative to those of the input polarizer.

Both the input polarizer 15 and the output polarizer 17 are wire grid polarizers 13 according to this invention. As can be seen in FIGS. 2 and 3, the wire grid polarizers 13 include a plurality of parallel, closely spaced conductors 25 provided on a radiation transmissive substrate 27, with the spacing between adjacent conductors defining transmissive zones 29 having a width less than the wavelength of transmitted radiation.

The acousto-optic crystal 19 as seen in FIG. 1 illustrates the crystalline b-c axes. The optical beam 21 is propagated at about 21 degrees to the crystallographic c or optic axis. While the angular relationship between the input radiation beam 19 and the optic axis is not critical and can be varied, this angular relationship can affect the specific RF frequency which is used to select or tune the desired narrow bandwidth wavelength of interest. The parallel, closely spaced conductors 25 of the input polarizer 15 are aligned with the plane formed by the b-c crystalline axis of the crystal 19 in order to efficiently polarize the input infrared radiation in a plane parallel to the b-c crystal plane. As best seen in FIGS. 2 and 3, the relative orientation of the input polarizer's 15 conductors 25 is illustrated as being horizontal, while the orientation of the conductors 25 of the output polarizer 17 is orthogonal to those of the input polarizer 15. In this way, the output polarizer 17 transmits only the 90 degree rotated, polarized narrow bandwidth portion of the infrared radiation transmitted through the acousto-optic tunable filter 11 and blocks out the remaining infrared radiation.

Figure 4:
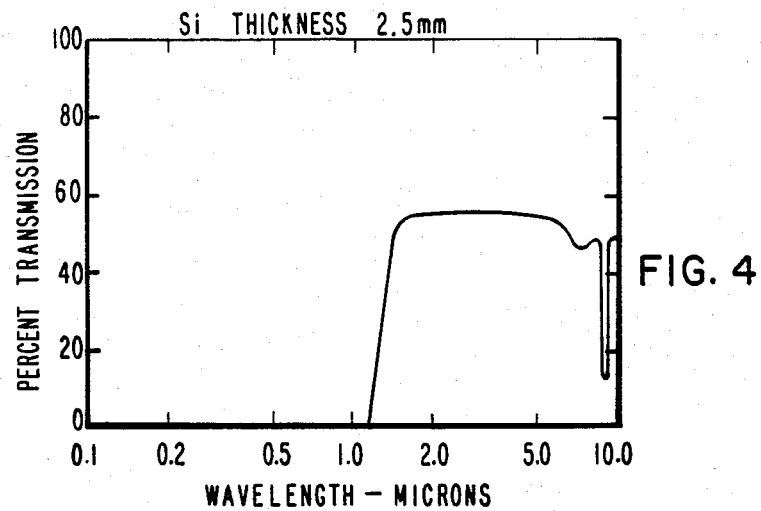
FIG. 4 is a graph illustrating the infrared transmission characteristics of a silicon substrate.

The wire grid polarizer 13 of this invention is preferably fabricated on a silicon substrate or wafer 27 about 0.3 mm in thickness and about 7.6 cm in diameter. As can be seen in the graph of FIG. 4, the transmission spectra of a 2.5 mm thick wafer of silicon indicates that silicon is very transparent beyond a wavelength of 1.1 $\mu$m. Accordingly, silicon is an ideally suited material for infrared applications.

Figure 5A:
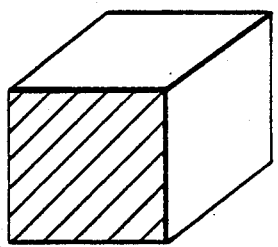
FIGS. 5A, 5B and 5C illustrate respectively (100), (110) and (111) planes of a silicon crystal.
Figure 5B:
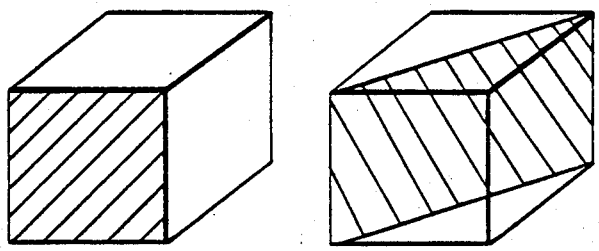
Figure 5C:
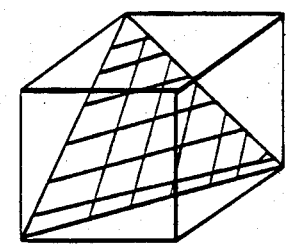
Figure 6A:
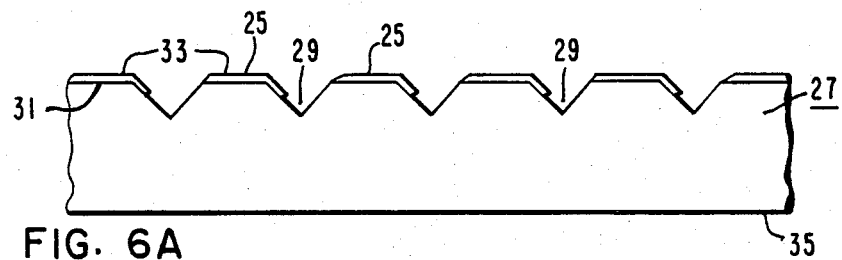
FIGS. 6A, 6B and 6C illustrate greatly enlarged cross-sectional views of wire grid polarizers illustrating the V-grooves at the surface of the substrate.

As an element from group IV of the periodic table, silicon crystallizes in a diamond cubic crystal lattice structure in which each silicon atom is tetrahedrally coordinated to four like atoms. In the processing of devices from a silicon substrate, the (100), (110) and (111) low index planes are typically used. The orientation of these planes is shown in FIGS. 5A-C. A silicon substrate oriented so that the surface corresponds to a (100) plane is preferred in the manufacture of a wire grid polarizer according to this invention. The surface of the silicon substrate is preferentially etched by a KOH or Ethylenediamine-H$_2$O system, or a Hydrazine system. The use of these systems enables the etching of rectangular and V-shaped grooves in the (100) and (110) planes of the silicon substrate. A single crystal silicon substrate oriented in the (100) plane is cleaned and then exposed to oxygen in a high-temperature furnace in order to grow a uniform layer of silicon dioxide on its surface. The silicon dioxide is coated with a photoresist material. Two argon-ion laser beams are holographically interferred to obtain a fringe pattern of about 2000 lines per millimeter. The argon-ion laser beam has a wavelength of 4579 Angstroms. After exposure, the photoresist is developed and baked. The wafer is exposed to a material which etches the silicon dioxide not protected by the photoresist. The etching of the silicon dioxide can be accomplished through, for example, ion-bombardment. The photoresist is then stripped from the silicon dioxide and the remaining silicon dioxide becomes a mask for the etching of V-grooves into the surface of the silicon substrate itself. The V-grooves are etched into the surface of the silicon through one of the aforedescribed etching systems which are utilized in the art of integrated system fabrication. (For further information see *Introduction to VLSI Systems*, Mead and Conway; Addison Wesley Publishing Co., 1980.) The V-groove etching process is a self-limiting process. The V-groove sidewalls are in the (111) plane which etches relatively slowly in comparison with the (100) or the (110) oriented silicon surface. The depth of the V-groove etch depends on the oxide window opening on the wafer surface as defined by adjacent oxide masks. Once the etching process is completed, the silicon dioxide mask is removed. The V-groove etched silicon surface is oriented at an oblique angle and coated with aluminum to form the plurality of narrow conductors 25. As can be seen in FIG. 6A, at least a portion of each V-groove and the unetched silicon surface 31 is coated with aluminum or other conducting metals such as gold or the like as at 33 to form conductors 25 which alternate with sections of radiation transmissive substrate 29, defined by the V-grooves.

Figure 6B:
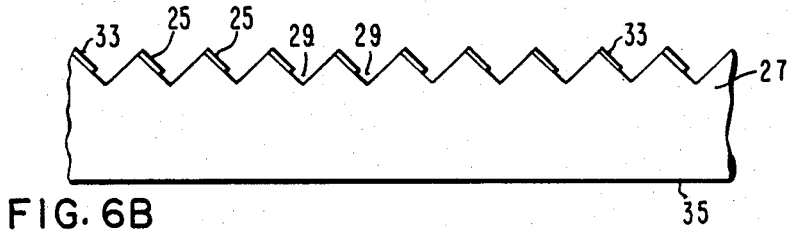

Although, as previously indicated, argon-ion laser beams provide a fringe pattern of about 2000 lines per millimeter, it is possible to at least double the fringe pattern to approximately 4000 lines per millimeter. The photoresist coated silicon substrate is exposed holographically and V-grooves etched as before on the (100) plane oriented silicon. After the silicon dioxide is removed, the silicon substrate is preferentially etched once again. The V-grooves are (111) planes and the etch rate of (111) planes is about 400–600 times less than that of (100) planes. The second V-groove etching process will have a negligible effect of the V-grooves previously etched. The result is that a new V-groove is formed between each previously etched pair of V-grooves. The silicon substrate is aluminized at an oblique angle as previously described. As illustrated in FIG. 6B, the conductor 25 density on the substrate is now doubled and the degree of polarization achieved by the wire grid polarizer markedly increases at all wavelengths.

Figure 6C:
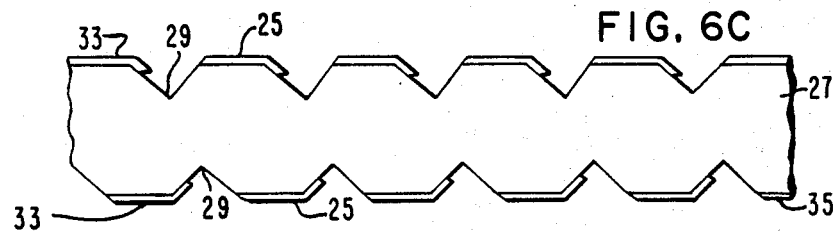

Additionally, as in FIG. 6C, the opposing surface 35 of the silicon substrate 27 can be etched to provide increased polarization capacity. Thus, either one side or both sides of a silicon substrate can be subjected to either a single or multiple etching process.

A silicon crystal has been described as the preferred substrate for the wire grid polarizer of this invention because it has particularly desirable infrared transmission characteristics. It should also be appreciated that silicon crystal is a relatively inexpensive material. In an alternative embodiment, a wire grid polarizer can also be based on a gallium arsenide substrate. Single crystal gallium arsenide (GaAs) can be preferentially etched to form V-grooves according to the previously described method. Although gallium-arsenide is significantly more expensive than silicon, it is useful for infrared transmissive optics because its transmission extends from a wavelength of about 2 to 25 μm.

What has been described is a wire grid polarizer formed on an infrared transmissive substrate particularly well suited for use with acousto-optic tunable filters.

What is claimed is:

1. In an infrared acousto-optic tunable filter consisting of: an input wire grid polarizer adapted to have input infrared radiation directed through the polarizer and to be polarized thereby; an acousto-optic member, optically aligned with the input polarizer, comprising an acousto-optic crystal and an rf transducer means coupled to the crystal to launch acoustic waves in the crystal which interact with a selected bandwidth portion of the polarized input infrared radiation to shift the polarization of the selected bandwidth portion by 90 degrees so that it is distinguishable from the remaining input infrared radiation, which selected bandwidth portion is a function of the rf energy input frequency; an output wire grid polarizer optically aligned with the output face of the acousto-optic crystal and oriented with the wires aligned orthogonal to the wires of the input wire grid polarizer, whereby only the 90-degree shifted polarized selected bandwidth portion of the infrared radiation transmitted through the acousto-optic member passes through the output wire grid polarizer for analysis, the improvement wherein said input and output wire grid polarizers each comprise:

a substrate selected from the group consisting of single crystal silicon and single crystal gallium arsenide and having an infrared radiation input surface and an infrared radiation output surface opposite said input surface, both of said surfaces having alternately disposed infrared transmissive zones and electrically conductive zones, said conductive zones having a spacing of at least about 2000 zones per millimeter.

2. The improved infrared acousto-optic tunable filter of claim 1 wherein a plurality of V-shaped grooves define the infrared transmissive zones.

3. The improved infrared acousto-optic tunable filter of claim 2 wherein a portion of each of the plurality of V-shaped grooves has a coating of a conductive material deposited therein rendering said coated portion conductive.

4. The improved infrared acousto-optic tunable filter of claim 3 wherein the infrared transmissive zones have a width less than the wavelength of the infrared radiation transmitted therethrough.

5. A wire grid polarizer for the infrared portion of the electromagnetic spectrum comprising an infrared transmissive substrate with a first surface and a second surface opposite thereto, said first surface being an input surface and said second surface being an output surface, both of said surfaces having infrared transmissive zones and electrically conductive zones alternately disposed thereon, said transmissive zones having a width less than the wavelength of the portion of the infrared spectrum of interest.

6. The wire grid polarizer according to claim 5 wherein the infrared transmissive substrate is selected from the group consisting of single crystal silicon and single crystal gallium-arsenide.

7. The wire grid polarizer according to claim 5 wherein the conductive zones are disposed on the substrate surfaces at the rate of at least 2000 conductive zones per millimeter.

8. The wire grid polarizer according to claim 7 wherein the conductive zones are disposed on the substrate surfaces at the rate of at least 4000 conductive zones per millimeter.

9. In an infrared acousto-optic tunable filter consisting of an input wire grid polarizer adapted to have infrared radiation directed through the polarizer and to be polarized thereby, an acousto-optic member optically aligned with the input polarizer comprising an acousto-optic crystal and an rf transducer means coupled to the crystal to launch acoustic waves in the crystal which interacts with a selected bandwidth portion of the polarized input infrared radiation to shift the polarization of the selected bandwidth portion by 90 degrees so that it is distinguishable from the remaining input infrared radiation, which selected bandwidth portion is a function of the rf energy input frequency, an output wire grid polarizer optically aligned with the output face of the acousto-optic crystal and oriented with the wires aligned orthogonal to the wires of the input wire grid polarizer, whereby only the 90-degree shifted polarized selected bandwidth portion of the infrared radiation transmitted through the acousto-optic member passes through the output wire grid polarizer for analysis, the improvement wherein said input and output wire grid polarizers each comprise:

an infrared transmissive substrate selected from the group consisting of silicon and gallium arsenide, said substrate having a first surface and a second surface opposite thereto, said first surface being an input surface and said second surface being an output surface, both said surfaces having infrared transmissive zones and conductive zones alternately disposed thereon, said transmissive zones having a width less than the infrared wavelength of interest.

* * * * *